United States Patent
Suehiro et al.

(10) Patent No.: US 7,167,609 B2
(45) Date of Patent: Jan. 23, 2007

(54) OPTICAL SWITCH

(75) Inventors: Masayuki Suehiro, Tokyo (JP); Shinji Iio, Tokyo (JP); Shinichi Nakajima, Tokyo (JP); Yoshiyuki Asano, Tokyo (JP); Morio Wada, Tokyo (JP); Akira Miura, Tokyo (JP); Katsuya Ikezawa, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 11/245,196

(22) Filed: Oct. 7, 2005

(65) Prior Publication Data
US 2006/0078250 A1   Apr. 13, 2006

(30) Foreign Application Priority Data
Oct. 13, 2004   (JP) .......................... P.2004-298747

(51) Int. Cl.
G02B 6/42   (2006.01)
G02B 6/26   (2006.01)

(52) U.S. Cl. ............................. 385/16; 385/17; 385/18; 385/19; 385/20; 385/21; 385/22; 385/23

(58) Field of Classification Search ............. 385/16–23
See application file for complete search history.

(56) References Cited

U.S. PATENT DOCUMENTS

2003/0156793 A1* 8/2003 Kawamoto et al. ........... 385/41

2004/0131305 A1* 7/2004 Fouquet et al. ............... 385/16

FOREIGN PATENT DOCUMENTS

| JP | 6-82847 A | 3/1994 |
| JP | 2004-29171 A | 1/2004 |
| JP | 2004-29172 A | 1/2004 |

OTHER PUBLICATIONS

K. Ishida, "InGaAsP/InP optical switches using carrier induced refractive index change", Appl. Phys. Lett., Jan. 19, 1987, pp. 141-142, vol. 50, No. 3.

* cited by examiner

*Primary Examiner*—Brian Healy
*Assistant Examiner*—Jerry Martin Blevins
(74) *Attorney, Agent, or Firm*—Sughrue Mion, PLLC

(57) ABSTRACT

An optical switch has an input port, output ports, optical waveguides whose output path of an optical signal branch into two. A first stage optical switch section is provided in a branching portion of the optical waveguide, which switches a propagating path of an optical signal to a path leading to the desired output port. A subsequent stage optical switch section is provided in a branching portion of the optical waveguide subsequent to the first stage optical switch section, which switches a propagating path of a leakage light, which is leaked from the first stage optical switch section, to a path which does not propagates the leakage light to any of the output ports. The first stage optical switch section and the subsequent stage optical switch section switch a path of an optical signal according to a refractive index change caused by a carrier injection.

3 Claims, 6 Drawing Sheets

OPTICAL SWITCH

CROSS-REFERENCE TO RELATED APPLICATIONS

This application is based upon and claims the benefit of priority from the prior Japanese Patent Applications No. 2004-298747, filed on Oct. 13, 2004, the entire contents of which are incorporated herein by reference.

BACKGROUND OF THE INVENTION

1. Field of the Invention

This invention relates to an optical switch having an input port on which an optical signal is incident, output ports from which an optical signal is outputted, and a plurality of optical waveguides whose output path of an optical signal branch into two, a propagating path of an optical signal incident from the input port is selected to output the optical signal from a desired output port among the output ports. The invention particularly relates to an optical switch of an optical waveguide type, which enables to easily perform a timing-adjustment of a plurality of optical switch sections.

2. Description of the Related Art

Optical waveguide type optical switches are used in optical communication systems and optical exchange systems. Hitherto, there are various kinds of optical-waveguide-type optical switches, for example, the directional coupler type, the Mach-Zehnder interferometer type, and the carrier injection type ones, which use an electro-optical effect. FIG. 6 shows the configuration of a two-input two-output type optical switch that has one of the most fundamental structures.

As shown in FIG. 6, optical signals are incident to an optical switch section SW from input ports Pi(1) and Pi(2), respectively. Then, an optical waveguide, through which an optical signal propagates, is selected in the optical switch section SW. That is, the propagation path of the optical signal is switched to an optical wave guide that propagates the optical signal to a desired one of output ports Po(1) and Po(2). Thus, an optical signal, which is incident from the input port Pi(1) or Pi(2), is outputted from the desired output port Po(1) or Po(2).

It is difficult for the optical waveguide type optical switch shown in FIG. 6 to output all optical power of an incident optical signal only to a desired output port Po(1) or Po(2). For example, even when the switch section SW selects the path to the output port Po(1), a leakage light is generated in the optical switch section SW. Thus, the optical waveguide type optical switch shown in FIG. 6 has a problem that this leakage light is also outputted from the output port Po(2).

The optical communication system and the optical exchange system require that an extinction ratio (that is, a ratio of optical power in a state, in which an optical signal is outputted, to optical power in a state in which no optical signal is outputted) ranges from 20 dB to 30 dB or more. In other words, it is necessary to reduce the crosstalk between the output ports Po(1) and Po(2). However, the extinction ratio in related optical switches is, for instance, about 100 dB.

Thus, an apparatus having multiple stages of optical switches, each of which is shown in FIG. 6 and is connected to optical switch of another stage by an optical fiber, has been proposed. FIG. 7 shows the configuration of a related optical switch apparatus whose extinction ratio is improved (see, for instance, JP-A-6-82847). In FIG. 7, each of optical switches 11 to 13 is the same as the optical switch shown in FIG. 6, and has an optical switch section that selects a desired path by using the electro-optical effect.

For example, an optical switch section of an optical switch 11 selects one of paths, which are respectively connected to optical fibers F1 and F2, for an optical signal that is incident thereon from an input port Pi (3) or Pi (4). The optical signal transmitted by the optical fiber F1 is incident on an optical switch 12. Then, an optical switch section of the optical switch 12 selects one of a path connected to an output port Po(3) and a dummy path. The optical signal transmitted by the optical fiber F2 is incident on an optical switch 13. Then, an optical switch section of the optical switch 13 selects one of a path connected to an output port Po(4) and a dummy path.

For example, in a case where an optical signal being incident on the input port Pi(3) is outputted from the output port Po(3), the optical switch 11 selects the path connected to the optical fiber F1. Subsequently, the optical switch 12 selects the path connected to the output port Po(3). Also, the optical switch 13 selects the dummy path. Therefore, although leakage light generated in the optical switch 11 is transmitted by the optical fiber F2, the leakage light hardly affects the output port Po(4), because the optical switch 13 selects the dummy path. Consequently, the extinction ratio and the crosstalk can be improved.

JP-A-6-82847 is referred to as a related art.

The optical switches 11 to 13 individually produced on different substrates are connected by the optical fibers F1 and F2 in a multistage arrangement. Thus, the extinction ratio and the crosstalk can be improved.

However, because the plural optical switches 11 to 13 are connected by the optical fibers F1 and F2, it is necessary that each of the distance between the optical switches 11 and 12 and the distance between the optical switches 11 and 13 is at least tens cm. Thus, a large delay time (several nsec) is generated between a moment, at which an optical signal is outputted from the optical switch 11, and a moment at which the optical signal reaches each of the optical switches 12 and 13. Therefore, it is necessary that the optical switch section switches the path in consideration of the delay time. Consequently, the related optical switch apparatus has a problem in that it is difficult for the optical switch section to perform timing adjustment.

For instance, in a case where the timing interval between the incidences of optical signals respectively representing data is short, and where an optical signal representing first data is first outputted from the optical switch 11 and another optical signal representing second data is subsequently outputted therefrom, the optical signal representing the second data may be incident on the optical switch 11 before the switching of the path for the optical signal representing the first data is completed in the optical switch 12 or 13. Therefore, it is necessary to individually control the optical switches 11 to 13 according to the incidence timing of each of the optical signals in high-speed optical signal processing. Thus, the related optical switch apparatus has a problem in that it is difficult for the optical switch to perform timing adjustment.

Additionally, it is very difficult to adjust the lengths of the optical fibers F1 and F2, which respectively connect the optical switch 11 to the optical switches 12 and 13, to the same length. This causes a difference between the delay times respectively corresponding to the optical switches 12 and 13. Therefore, the related optical switch apparatus has a problem in that it is more difficult to adjust timing with which the path is switched by the optical switch section.

SUMMARY OF THE INVENTION

An object of the invention is to provide an optical switch of an optical waveguide type, which enabled to easily achieve timing-adjustment among a plurality of optical switch sections.

The invention provides an optical switch, having: an input port on which an optical signal is incident; a plurality of output ports from which an optical signal is outputted; and a plurality of optical waveguides whose output path of an optical signal branch into two, wherein a propagating path of an optical signal incident from the input port is selected to output the optical signal from a desired output port among the output ports. The optical switch further has: a first stage optical switch section which is provided in a branching portion of the optical waveguide, and switches a propagating path of an optical signal to a path leading to the desired output port; and a subsequent stage optical switch section which is provided in a branching portion of the optical waveguide subsequent to the first stage optical switch section, and switches a propagating path of a leakage light, which is leaked from the first stage optical switch section, to a path which does not propagates the leakage light to any of the output ports, wherein the input port, the output ports, the optical waveguides, the first stage optical switch section, and the subsequent stage optical switch section are provided on a same substrate, and the first stage optical switch section and the subsequent stage optical switch section switch a path of an optical signal according to a refractive index change caused by a carrier injection.

In the optical switch, a plurality of the subsequent-stage optical switch sections are provided in a multistage arrangement.

The optical switch further has a dummy output port from which the leakage light is outputted, wherein the subsequent light switch portion switches the propagating path of the leakage light to a path leading to the dummy output port.

According to the optical switch, the input port, the output port, the optical waveguides, and the optical switch sections of the carrier injection type are provided on the same substrate. Further, the subsequent stage optical switch section propagates the leakage light generated by the first stage optical switch section to a part other than the output ports. Consequently, the extinction ratio and the crosstalk can be improved. Additionally, the distance between the first stage optical switch section and the subsequent stage optical switch section is short. Thus, transmission delay of an optical signal hardly occurs. This facilitates the timing adjustment among plural optical switch sections.

Also, the optical waveguides connecting the optical switch sections are provided on the same substrate. Thus, optical fiber coupling is employed only between the ports, on which optical signals are incident, in a monolithic optical switch and the ports, from which optical signals are outputted, in another monolithic optical switch. Consequently, coupling loss can be reduced.

According to the optical switch, since the plurality of the subsequent stage optical switch sections are provided in a multistage arrangement, the extinction ratio and the crosstalk can be improved still more.

DETAILED DESCRIPTION OF THE PREFERRED EMBODIMENTS

Embodiments of the invention are described by referring to the accompanying drawings.

Figure 1:
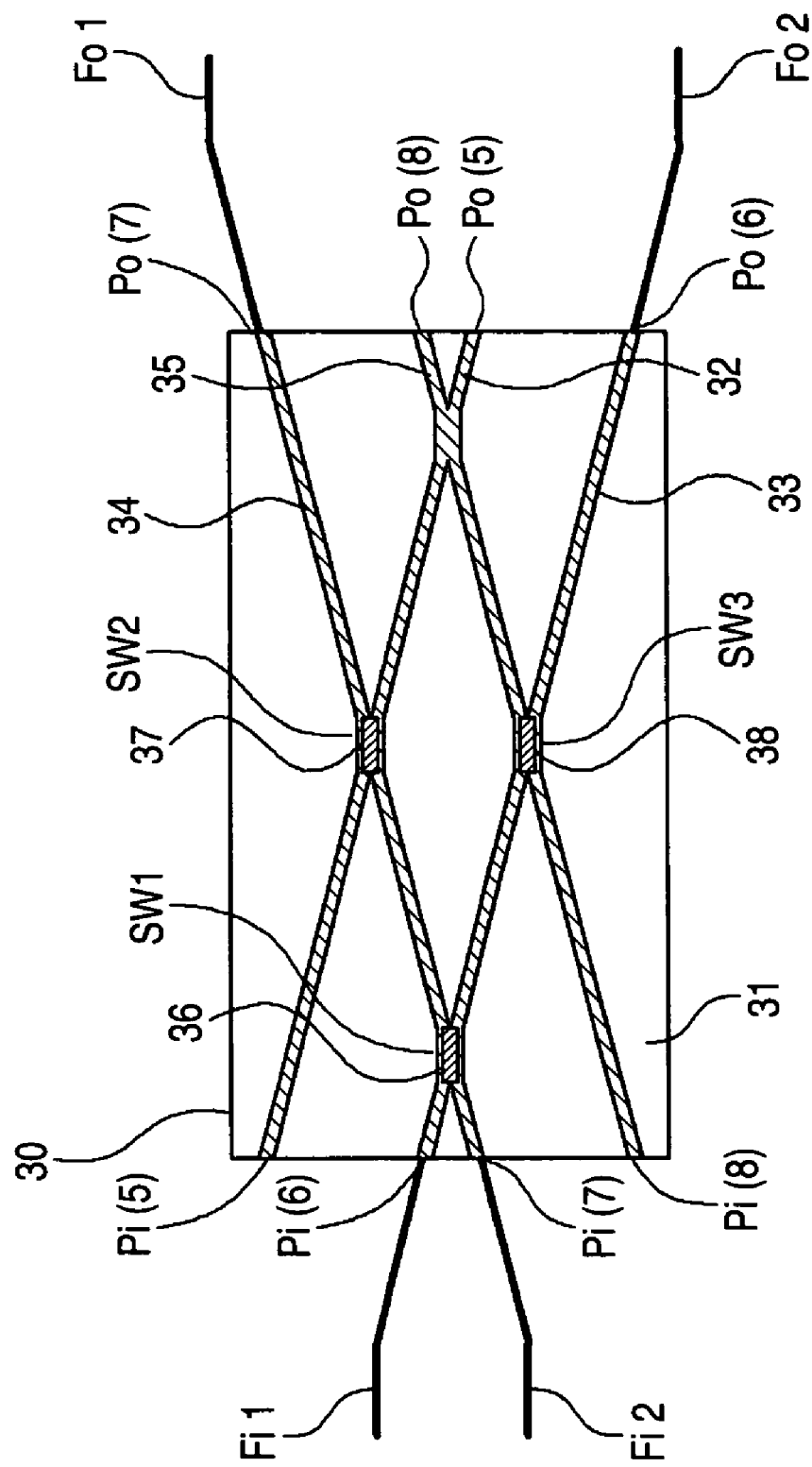
FIG. 1 is a view showing the configuration of an embodiment of an optical switch according to the invention.

FIG. 1 is a view showing the configuration of an embodiment of an optical switch 30 according to the invention. As shown in FIG. 1, optical waveguides 32 to 35 are formed on a semiconductor substrate 31. The optical waveguides 32 and 33 are provided on the substrate 31 in such a way as not to intersect with each other. Also, the optical waveguides 34 and 35 are provided on the substrate 31 in such a manner as not to intersect with each other.

The optical waveguide 32 intersects with each of the optical waveguides 34 and 35 at an associated one of different positions in a substantially X-shaped manner. The optical waveguide 33 intersects with each of the optical waveguides 34 and 35 at an associated one of different positions in a substantially X-shaped manner.

Each of the optical waveguide 32 to 35 is configured so that one-side ports are input ports Pi(5) to Pi(8), and that the other side ports are output ports Po(5) to Po(8). Further, the one-side input port Pi(6) of the optical waveguide 33 is connected to an incident-side optical fiber Fi1, while the other-side output port Po(6) is connected to an output-side optical fiber Fo2. Furthermore, the one-side input port Pi(7) of the optical waveguide 34 is connected to an incident-side optical fiber Fi2, while the other-side output port Po(7) is connected to an output-side optical fiber Fo1.

That is, the optical switch 30 has 4 input ports and 4 output ports. Although the output ports Po(6) and Po(7) are used for outputting optical signals to the exterior, the input ports Pi(5) and Pi(8) and the output ports Po(5) and Po(8) are dummy ports. No incident side optical fibers, which are used to make optical incident on the input ports, are connected to the input ports Pi(5) and Pi(8). No output side optical fibers, which are used to output optical signal, are not connected to the output ports Po(5) and Po(8). Therefore, practically, the optical switch 30 is of the two-input two-output type.

The first optical switch section SW1 is provided at an X-shaped intersecting portion (that is, a branching portion adapted to branch an optical signal) at which the optical waveguides 33 and 34 intersect with each other. The first optical switch section SW1 switches the path of an optical signal between the optical waveguides 33 and 34 respectively propagating optical signals to desired output ports Po(6) and Po(7).

The second optical switch SW2 is provided at a portion at which the optical waveguides 32 and 34 intersect with each other. The third optical switch SW3 is provided at a portion at which the optical waveguides 33 and 35 intersect with each other. Incidentally, the optical switch SW1 is a first stage optical switch section. Further, the optical switch sections SW2 and SW3 are subsequent stage optical switch sections.

The optical switch sections SW1 to SW3 serve to switch the paths of optical signals to thereby propagate the optical signals to the desired optical waveguides 32 to 35. Electrodes (for example, p-electrodes) 36 to 38 are provided at the X-shaped intersecting portions among the optical waveguides 32 to 35. Thus, carrier injection is performed on the intersecting portions. Incidentally, it is advisable to provide n-electrodes (not shown), which respectively correspond to the p-electrodes 36 to 38, in the vicinity of the p-electrodes or on the back surface of the substrate 31.

That is, the optical switch sections SW1 to SW3 are of the carrier injection type (see, for instance, JP-A-2004-29171, JP-A-2004-29172, and "InGaAsP/InP optical switches using carrier induced refractive index change", K. Ishida, et al., Applied Physics Letters, American Institute of Physics, pp. 141–142, 50(3), 19 (1987)).

Thus, the ports Pi(5) to Pi(8), Po(5) to Po(8), optical waveguides 32 to 35, and optical switch sections SW1 to SW3 are formed as monolithic devices on the same substrate 31.

An operation of the optical switch 30 is described hereinbelow. First, operations of the optical switch sections SW1 to SW3 is described. In a case where the optical switch sections SW1 to SW3 are turned off, no electric current is supplied to the electrodes 36 to 38 and electrodes (not shown).

Thus, the refractive index does not change at the X-shaped intersecting portions among the optical waveguides 32 to 35. Therefore, an optical signal goes straight through the intersecting portion and is propagated by the same optical waveguide 32, 33, 34, or 35. Incidentally, leakage light, whose optical power has a level obtained by attenuating the optical power of the optical signal going straight by about −10 dB, is incident on a different one of the optical waveguides 32 to 35.

For example, in a case where the optical switch section SW1 is turned off, most of an optical signal, which is incident from the incident side optical fiber Fi1 on the optical waveguide 33, goes straight in the optical switch section SW1 and is propagated by the same optical waveguide 33 and is then incident on the optical switch section SW3. Thus, leakage light, whose optical power is weak, as compared with the optical power of the optical signal goes straight, is incident on the optical waveguide 34.

Meanwhile, in a case where the optical switch sections SW1 to SW3 are turned on, electric current is supplied to the electrodes 36 to 38 and to electrodes (not shown). Carriers (electrons and holes) are injected into the intersecting portion of the optical waveguides 32 to 35. This carrier injection results in decrease in the refractive index of a part of each of the optical waveguides 32 to 35, which is placed in the vicinity of and under an associated one of the electrodes 36 to 38.

An optical signal initially propagated by each of the optical waveguides 32 to 35 is almost totally reflected at a boundary between a low-refractive-index region, which is caused in the intersecting portion, and a region, whose refractive index is hardly changed. Then, the reflected optical signal is incident on a different one of the optical waveguides 32 to 35. Incidentally, leakage light, whose optical power has a level obtained by attenuating the optical power of the optical signal going straight by about −10 dB, is propagated by the same optical waveguide 32, 33, 34, or 35, by which the optical signal is initially propagated.

For instance, in a case where the optical switch section SW1 is turned on, most of an optical signal, which is incident on the optical waveguide 33 from the incident side optical fiber Fi1, is almost totally reflected at the optical switch section SW1 and is then on the different optical waveguide 34. Subsequently, leakage light, whose optical power is weak, as compared with the optical power of the reflected optical signal, goes straight in the optical waveguide 33.

Next, an operation of outputting an optical signal, which is incident on the optical switch 30 from the input port Pi(6) or Pi(7), from a desired output port Po(6) or Po(7) is described.

Figure 2:
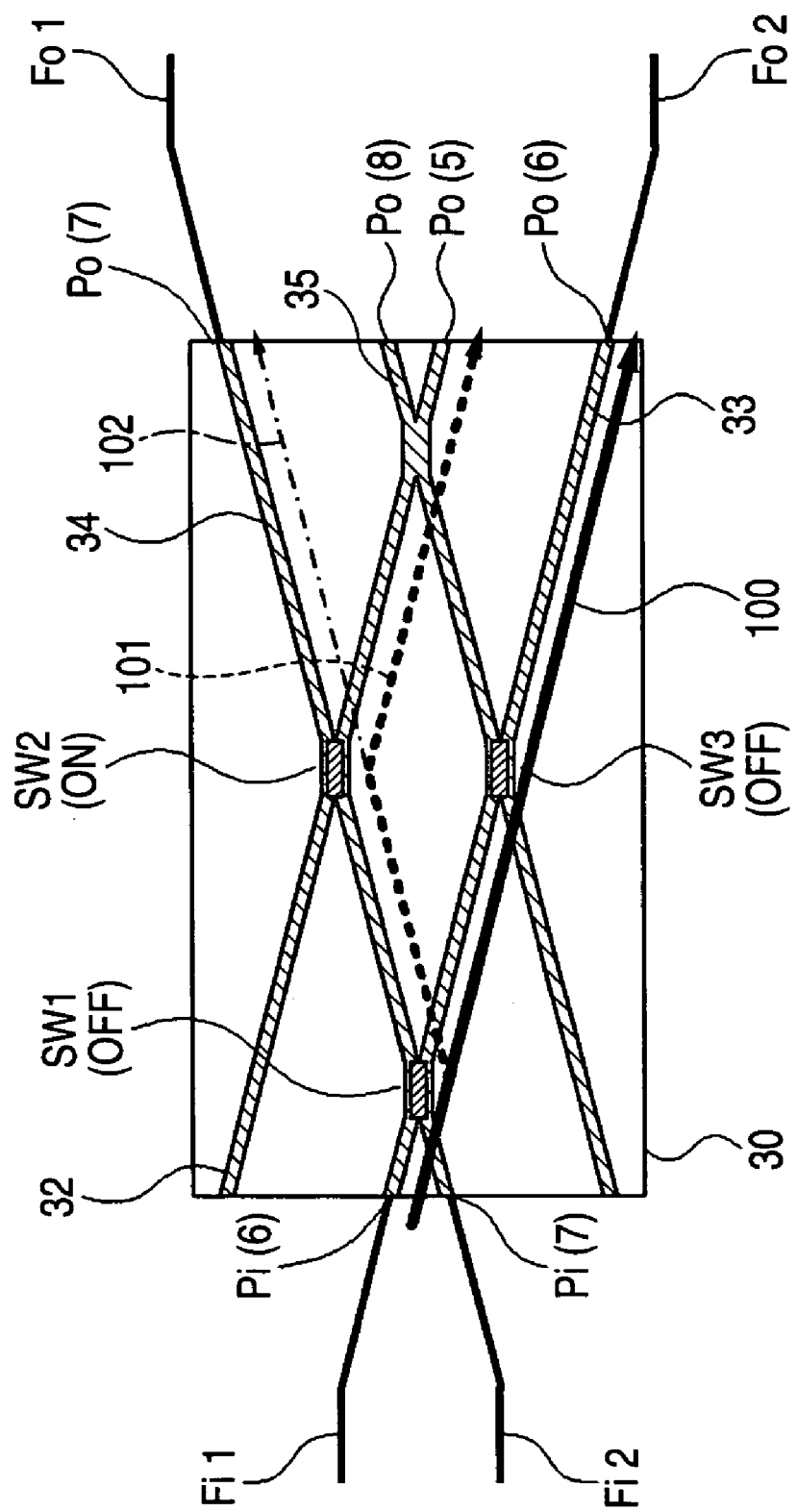
FIG. 2 is a schematic view showing an example of propagation of optical signals in the optical switch shown in FIG. 1.

Hereinafter, an operation of outputting an optical signal, which is incident from the input port Pi(6), from the output port Po(6) is described by way of example with reference to FIG. 2. FIG. 2 is a view schematically illustrating the propagation of an optical signal in the optical switch shown in FIG. 1. Incidentally, each component, which is the same as that shown in FIG. 1, are designated by the same reference character as used for denoting the component in FIG. 1. The description of each of such components is omitted herein.

A driver (not shown), which outputs electric control signals causing the optical switch sections to turn on and off the optical switch sections SW1 to SW3, turns off the optical switch sections SW1 and SW3 and turns on the optical switch section SW2. At that time, the optical switch sections SW2 and SW3 may simultaneously be controlled. Alternatively, the optical switch sections SW1 to SW3 can simultaneously be controlled.

Consequently, an optical signal, which is transmitted by the incident side optical fiber Fi1 and is incident on the optical waveguide 33 of the optical switch 30 from the input port Pi(6), goes straight in the optical switch sections SW1 and SW3 and is then outputted from the output port Po(6). Further, this optical signal is outputted to the exterior by the output side optical fiber Fo2 (see a solid arrow 100 shown in FIG. 2).

Meanwhile, the leakage light reflected by the optical switch section SW1 is propagated by the optical waveguide 34 to the optical switch section SW2. Then, this leakage light is reflected by the optical switch section SW2. Subsequently, the reflected leakage light is propagated by the optical waveguide 32, and then is outputted from the dummy output port Po(5) (see a dashed-line arrow 101 shown in FIG. 2). Thus, when the leakage light (indicated by a dot-dash-line arrow 102 shown in FIG. 2) originated from the leakage light, which is generated in the optical switch section SW1, reaches the output port Po(7), which is not selected, the optical power of the leakage light having reached the output port Po(7) has a level obtained by attenuating the optical power of the optical signal, which has been incident on the optical switch 30 by −20 dB or less.

Figure 3:
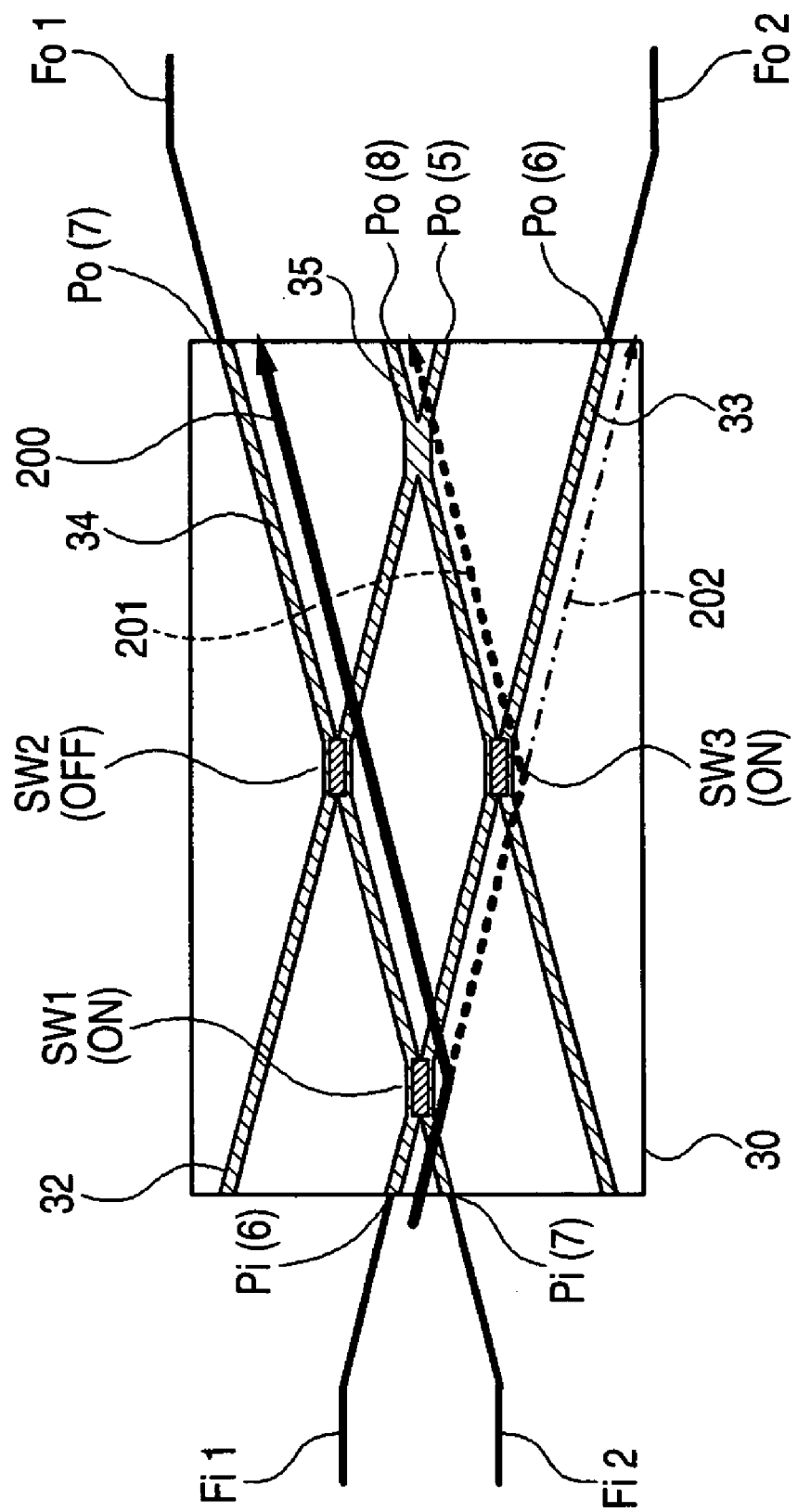
FIG. 3 is a schematic view showing another example of propagation of optical signals in the optical switch shown in FIG. 1.

Next, an operation of outputting an optical signal, which is incident from the input port Pi(6), from the output port Po(7) is described with reference to FIG. 3. FIG. 3 is a view schematically illustrating the propagation of an optical signal in the optical switch shown in FIG. 1. Incidentally, each component, which is the same as that shown in FIG. 1, are designated by the same reference character as used for denoting the component in FIG. 1. The description of each of such components is omitted herein.

The driver (not shown) turns on the optical switch sections SW1 and SW3 and turns off the optical switch section SW2. At that time, the optical switch sections SW2 and SW3 may be controlled simultaneously. Alternatively, the optical switch sections SW1 to SW3 may be controlled simultaneously.

Consequently, an optical signal, which is transmitted by the incident side optical fiber Fi1 and is incident on the optical waveguide 33 of the optical switch 30 from the input port Pi(6), is reflected by the optical switch section SW1 and is then propagated by the optical waveguide 34 to the optical switch section SW2. Subsequently, the optical signal goes straight in the optical switch section SW2 and is then outputted from the output port Po(7) Further, this optical signal is outputted to the exterior by the output side optical fiber Fo1 (see a solid arrow 200 shown in FIG. 3).

Meanwhile, the leakage light goes straight in the optical switch section SW1 is reflected by the optical switch section SW3 and is then propagated by the optical waveguide 35. Then, this leakage light is outputted from the dummy output port Po(8) (see a dashed-line arrow 201 shown in FIG. 3). Thus, when the leakage light (indicated by a dashed-line arrow 202 shown in FIG. 3) originated from the leakage light, which is generated in the optical switch section SW1, reaches the output port Po(6), which is not selected, the optical power of the leakage light having reached the output port Po(6) has a level obtained by attenuating the optical power of the optical signal, which has been incident on the optical switch 30 by −20 dB or less.

Figure 4:
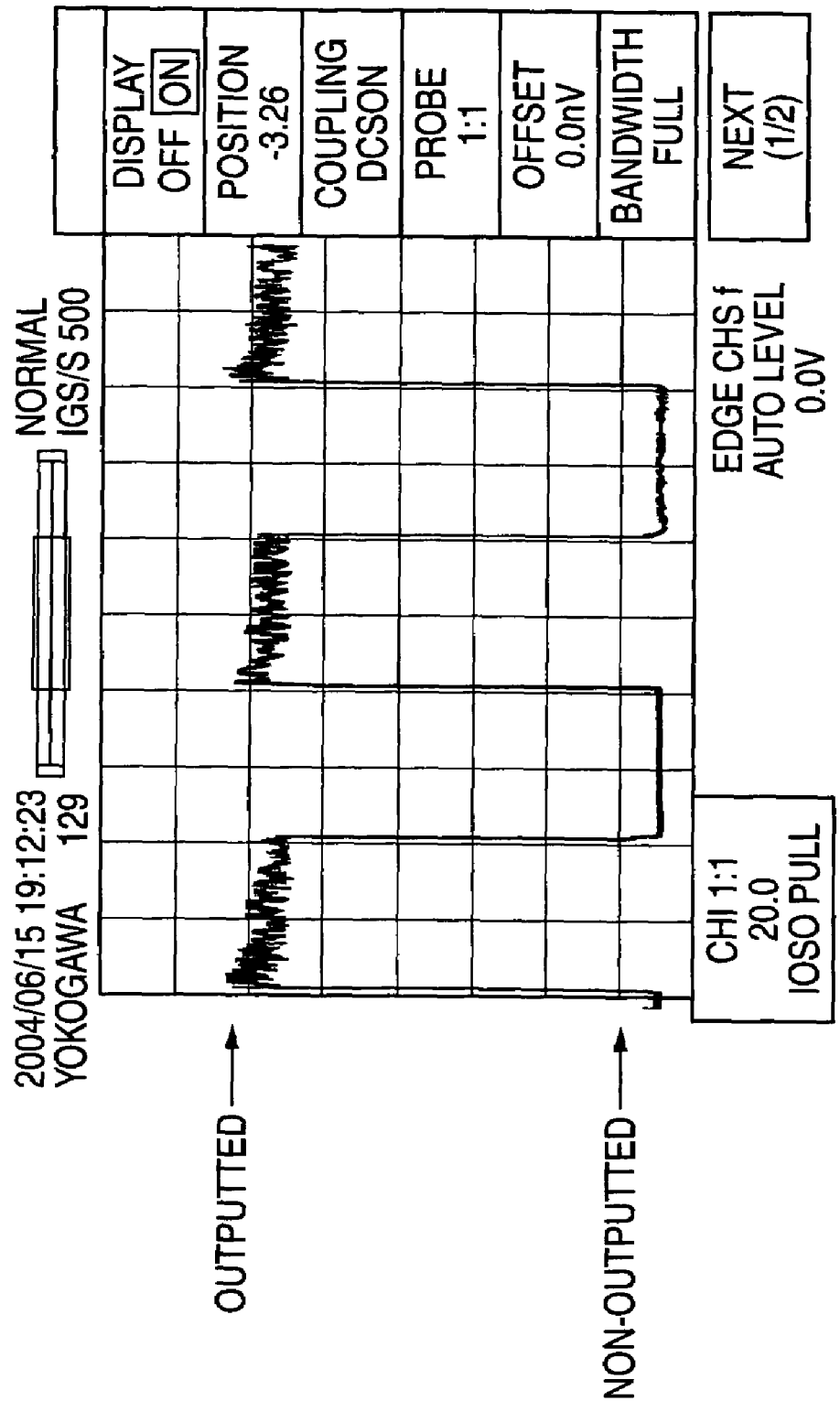
FIG. 4 is a chart showing a result of measurement of an extinction ratio of the optical switch shown in FIG. 1.

Incidentally, FIG. 4 is a graph showing a result of measurement of the extinction ratio of the optical switch shown in FIG. 1, that is, showing a result of measurement of an optical signal outputted from the output port Po(6) (or Po(7)). The optical switch sections SW1 to SW3 are turned on/off at a frequency of 500 kHz. As shown in FIG. 4, a distinction ratio of 20 dB or more is obtained.

Incidentally, in a case where an optical signal, which is incident from the input port Pi(7), is outputted from the output port Po(7), it is advisable to turn off the optical switch sections SW1 and SW2, and to turn on the optical switch section SW3, and to output leakage light, which is generated by the optical switch section SW1, to the dummy output port Po(8). Further, in a case where an optical signal, which is incident from the input port Pi(7), is outputted from the output port Po(6), it is advisable to turn on the optical switch sections SW1 and SW2, and to turn off the optical switch section SW3, and to output leakage light, which is generated by the optical switch section SW1, to the dummy output port Po(5).

Thus, the pots Pi(5) to Pi (8), and Po(5) to Po(8), the optical waveguides 32 to 35, and the carrier injection type optical switch sections SW1 to SW3 are provided on the same substrate 31. Leakage light, which is generated by the optical switch SW1, is outputted by the optical switch sections SW2 and SW3 to the dummy output ports Po(5) and Po(8). Consequently, the extinction ratio and the crosstalk can be improved. Also, because the distances among the optical switch sections SW1 to SW3 are short, the transmission delay of an optical signal hardly occurs. Consequently, timing adjustment among a plurality of optical switch sections SW1 to SW3 is facilitated.

Figure 7:
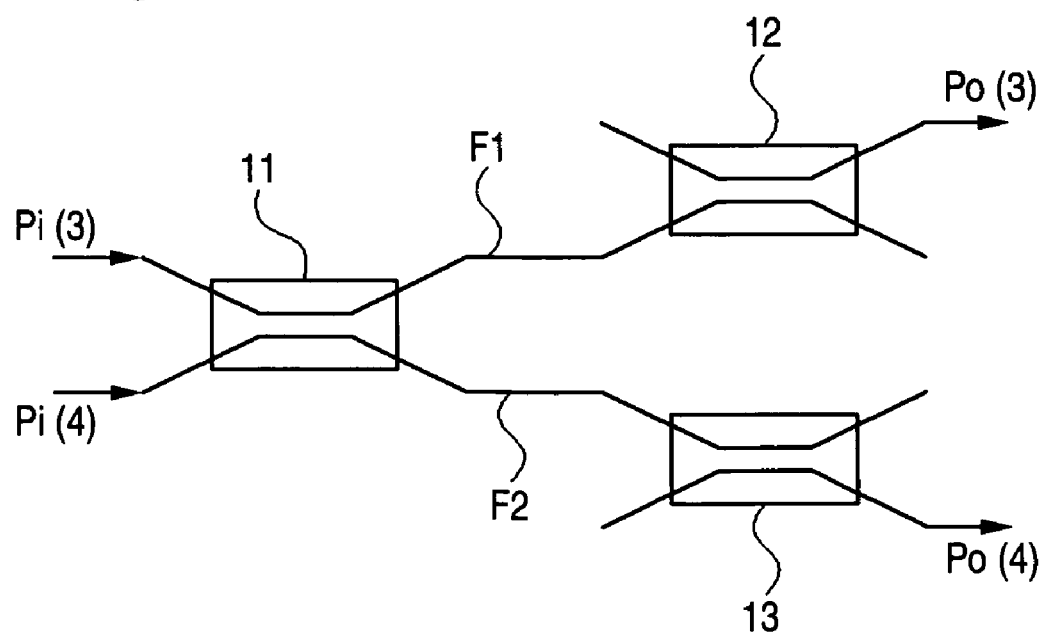
FIG. 7 is a view showing the configuration of a related optical switch apparatus, whose properties are improved.

Practically, as shown in FIG. 7, the optical switches 11 to 13 utilizing change in the refractive index due to electro-optical effects, which use a semiconductor substrate, have polarization dependence, so that the change in the refractive index is small. Thus, the length of the devices in an active part, which changes the refractive index by applying a voltage thereto, reaches several millimeters (mm). Consequently, the size of the device of the optical switch section is very large. Also, the applied voltage is very high. Furthermore, because the optical switches 11 to 13 individually produced on different substrates are connected by using optical fibers F1 and F2, very large delays occur among the optical switches 11 to 13.

Conversely, the carrier injection type optical switch sections SW1 to SW3 shown in FIG. 1 are large in change of the refractive index due to the carrier injection. Thus, the length of the device in the active part can be set to be small (that is, several tens to several hundreds microns (μm)). Consequently, it easy to form such optical switch sections as monolithic devices in a multistage manner on the same substrate. Also, operating voltages thereof can be set to be low.

That is, the size of the optical switch 30 including the optical switch sections SW1 to SW3 can be set to be nearly equal to or less than that of the optical switch 11 having only one switch section SW.

Further, because of the facts that the optical waveguides 32 to 35 are made to intersect with one another, and that the optical switch sections are provided at the intersecting portions, the distance between the optical switch sections SW1 and SW2 can be set to be equal to that between the optical switch sections SW1 and SW3.

Therefore, the carrier injection type optical switch sections SW1 to SW3 are provided as monolithic devices on the same substrate 31. Thus, the size of the entire optical switch 30 is small. Also, the transmission delay time of an optical signal among the optical switch sections SW1 to SW3 can be reduced to be almost negligible. This facilitates very much the timing adjustment of an optical signal during a high speed operation.

Furthermore, because the optical waveguides 32 to 35 connecting the optical switch sections SW1 to SW3 are provided on the same substrate 31, only parts of the monolithic optical switch, into which optical signals are incident and from which optical signals are outputted, utilize optical fiber coupling using the optical fibers Fi1, Fi2, Fo1 and Fo2. Therefore, as shown in FIG. 7, the coupling loss can extremely be reduced, as compared with the case where the optical switches 11 to 13 are connected by the optical fibers F1 and F2.

Incidentally, the optical switch according to the invention is not limited thereto. The following modifications can be made.

Although the foregoing description of the embodiments has described the configuration in which the output ports Po(5) and Po(8) are dummy ports, instead, the optical fibers Fo1 and Fo2 may be connected to the output ports Po(S) and Po(8), and the outputs ports Po(6) and Po(7) may be set to be dummy ports. Needless to say, in this case, leakage light generated in the optical switch section SW1 is outputted to the dummy output ports Po(6) and Po(7) by switching the paths of optical signals at the optical switch sections SW2 and SW3.

Further, although the foregoing description of the embodiments has described the optical switch 30 having four input ports and four output ports, the optical switch may be configured to have many input ports and many output ports.

Additionally, although the foregoing description of the embodiments has described the configuration in which each of the single optical switch section SW2 and the single optical switch section SW3 is provided as the subsequent stage of each of the optical waveguides of the optical switch section SW1, a plurality of optical switch sections may be provided in a multistage arrangement as the subsequent stages of each of the optical waveguides of the optical switch section.

Figure 5:
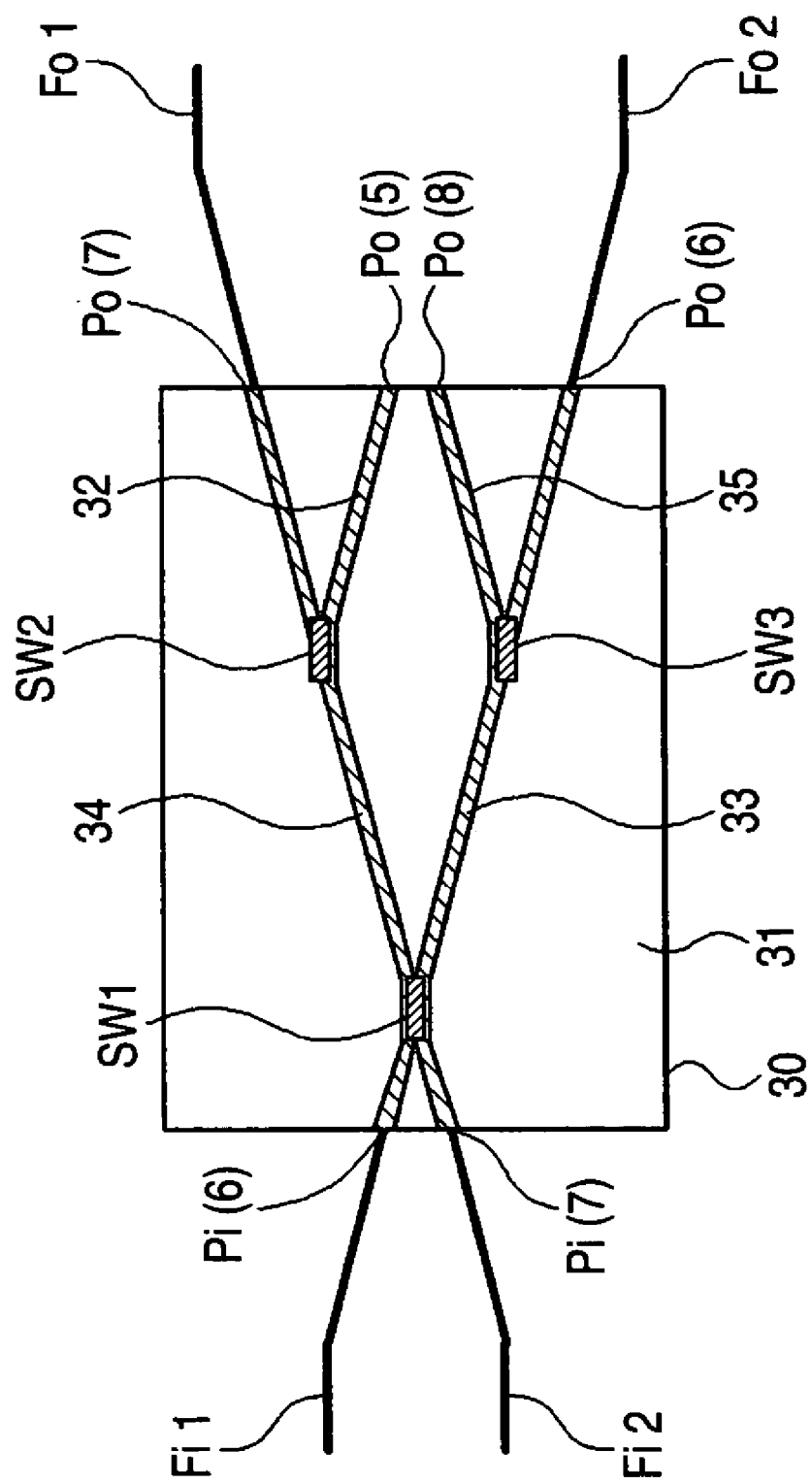
FIG. 5 is a view showing the configuration of another embodiment of the optical switch according to the invention.
Figure 6:
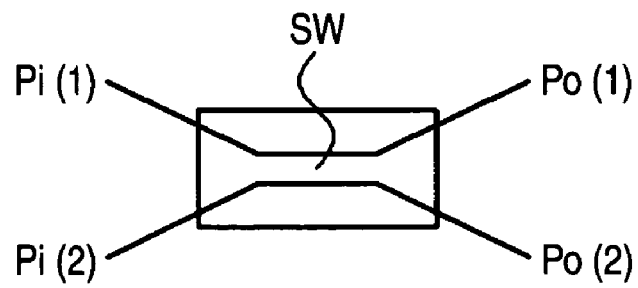
FIG. 6 is a view showing the configuration of a related optical switch.

Although the optical switch, in which a branching portion provided with the optical switch sections SW2 and SW3 of the subsequent stage is X-shaped, has been described, the branching portion may have a Y-shape or other shapes, as long as the branching portion has two optical waveguides used for selecting the path. Incidentally, a Y-shaped optical waveguide is formed by branching a single-straight-line-like optical waveguide at a halfway point into two waveguides inclined to the single-straight-line-like optical waveguide by different angles. FIG. 5 is a view illustrating the configuration of the optical switch, in which the branching portion provided with the optical switch sections 32 and 35 of the subsequent stage is Y-shaped.

Although the optical switch, in which the optical waveguides 32 and 35 intersect with each other, has been described, as is understood from FIG. 5, it is unnecessary that the optical waveguides 32 and 35 intersect with each other.

What is claimed is:

1. An optical switch, comprising:
   an input port on which an optical signal is incident;
   a plurality of output ports from which an optical signal is outputted; and
   a plurality of optical waveguides whose output path of an optical signal branches into two,
   wherein a propagating path of an optical signal incident from the input port is selected to output the optical signal from a desired output port among the output ports, the optical switch further comprising:
   a first stage optical switch section provided in a branching portion of the optical waveguide where at least two optical waveguides intersect for switching, a propagating path of an optical signal to a path leading to the desired output port; and
   a subsequent stage optical switch section provided in a branching portion of the optical waveguide where at least two optical waveguides intersect subsequent to the first stage optical switch section for switching a propagating path of a leakage light, which is leaked from the first stage optical switch section, to a path which does not propagates the leakage light to any of the output ports,
   wherein the input port, the output ports, the optical waveguides, the first stage optical switch section, and the subsequent stage optical switch section are provided on a same substrate, and
   the first stage optical switch section and the subsequent stage optical switch section switch a path of an optical signal according to a refractive index change caused by a carrier injection.

2. The optical switch according to claim 1,
   wherein a plurality of the subsequent-stage optical switch sections are provided in a multistage arrangement.

3. The optical switch according to claim 1, further comprising:
   a dummy output port from which the leakage light is outputted,
   wherein the subsequent light switch portion switches the propagating path of the leakage light to a path leading to the dummy output port.

* * * * *